(12) United States Patent
Nakamichi et al.

(10) Patent No.: US 7,522,855 B2
(45) Date of Patent: Apr. 21, 2009

(54) IMAGE FORMING SYSTEM AND IMAGE FORMING APPARATUS

(75) Inventors: Motoki Nakamichi, Hachioji (JP); Tetsuo Hirata, Hachioji (JP); Norishige Kato, Hachioji (JP); Takehiro Ogushi, Hachioji (JP); Yasushi Saitsu, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 77 days.

(21) Appl. No.: 11/339,504

(22) Filed: Jan. 26, 2006

(65) Prior Publication Data

US 2007/0036574 A1    Feb. 15, 2007

(30) Foreign Application Priority Data

Aug. 11, 2005  (JP) .............................. 2005-233211

(51) Int. Cl.
 *G03G 15/00* (2006.01)
(52) U.S. Cl. ............................. 399/82; 399/87; 399/382
(58) Field of Classification Search ................... 399/82, 399/87, 43, 46, 407, 410, 385, 390, 382
 See application file for complete search history.

(56) References Cited

U.S. PATENT DOCUMENTS

| 5,053,831 | A | * | 10/1991 | Ishiguro et al. ............. 399/370 |
| 5,452,068 | A |   | 9/1995 | Farrell |
| 5,740,497 | A |   | 4/1998 | Yamada et al. |
| 2002/0063881 | A1 | * | 5/2002 | Nakata et al. .............. 358/1.14 |

FOREIGN PATENT DOCUMENTS

| DE | 102 05 724 A1 | 8/2002 |
| JP | 06-286270 | 10/1994 |
| JP | 11-188948 | 7/1999 |
| JP | 2001-054968 | 2/2001 |
| JP | 2001-096870 | 4/2001 |
| JP | 2003-29956 | 1/2003 |
| JP | 2003-259051 | 9/2003 |
| JP | 2003-274151 | 9/2003 |
| JP | 2004-42539 | 2/2004 |
| JP | 2004-173291 | 6/2004 |
| JP | 2006-136022 | 5/2006 |
| JP | 2006-180159 | 7/2006 |

OTHER PUBLICATIONS

English translation of JPO pub #11-188948.*
Japanese Office Action mailed by the Japanese Patent Office on Mar. 4, 2008, in counterpart Japanese Patent Application No. 2005-233211.

(Continued)

*Primary Examiner*—David M Gray
*Assistant Examiner*—Geoffrey T Evans
(74) *Attorney, Agent, or Firm*—Finnegan, Henderson, Farabow, Garrett & Dunner, L.L.P.

(57) ABSTRACT

An image forming system including: an image forming apparatus which executes a print job to form an image on a recording medium; and a post processing apparatus which carries out a post processing to the medium on which the image has been formed; wherein, the image forming apparatus includes a control section to control the image forming apparatus such that, if there is a waiting period in a preceding print job being under execution, a succeeding print job is executed during the waiting period.

6 Claims, 9 Drawing Sheets

OTHER PUBLICATIONS

Extended European Search Report mailed by the European Patent Office on Apr. 28, 2008, in counterpart European Patent Application No. 06114375.6-2209.

Office Action mailed by the Japanese Patent Office on Jul. 22, 2008 in Japanese Patent Application No. 2007-136631.

* cited by examiner

IMAGE FORMING SYSTEM AND IMAGE FORMING APPARATUS

This application is based on Japanese Patent Application No. 2005-233211 filed with Japan Patent Office on Aug. 11, 2005, the entire content of which is hereby incorporated by reference.

BACKGROUND OF THE INVENTION

1. Technical Field

The present invention relates to image forming systems comprising an image forming apparatus and a post processing apparatus that carries out the sheet post processing on sheets with image forming executed on them, and to image forming apparatus.

2. Description of the Related Art

In recent years, in companies and schools, image forming apparatuses (for example, printers) are proliferating that can accept simultaneously a plurality of print jobs (hereinafter called merely as "jobs"). As such an image forming apparatus, in Patent Document 1, a technology has been disclosed of including a setting section that sets the output priority level for each job, and if the priority level of a succeeding job is higher than that of a preceding job and also if the preceding job does not carry out sheet post processing operations, the preceding job under execution is interrupted and the succeeding job is executed.

Figure 8:
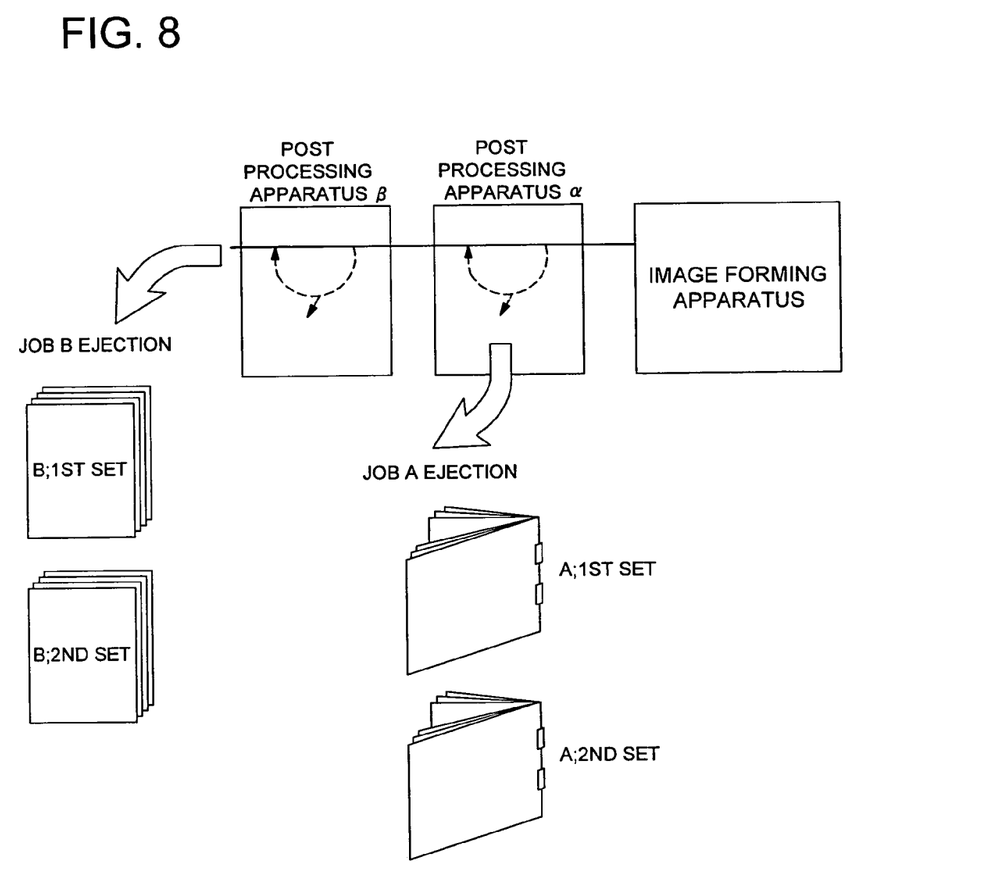
FIG. 8 is a diagram for explaining a job A that carries out center stitched output and a job B that carries out straight output without any sheet post processing operations.

In the following, the processing is explained briefly in a conventional image forming system having an image forming apparatus and a post processing apparatus. For example, as is shown in FIG. 8, in an image forming system in which two post processing apparatuses α and β are coupled to an image forming-apparatus, the output sheets (paper sheets) discharged by the image forming apparatus are subjected to sheet post processing operations in the respective post processing apparatus in units of a single sheet or in units of a booklet and are discharged. FIG. 8 shows an example in which the output sheets of Job A that carries out saddle stitching are discharged from a post processing apparatus α, and the output sheets of Job B that are not subjected to sheet post processing operations are discharged from the post processing apparatus β.

Figure 9:
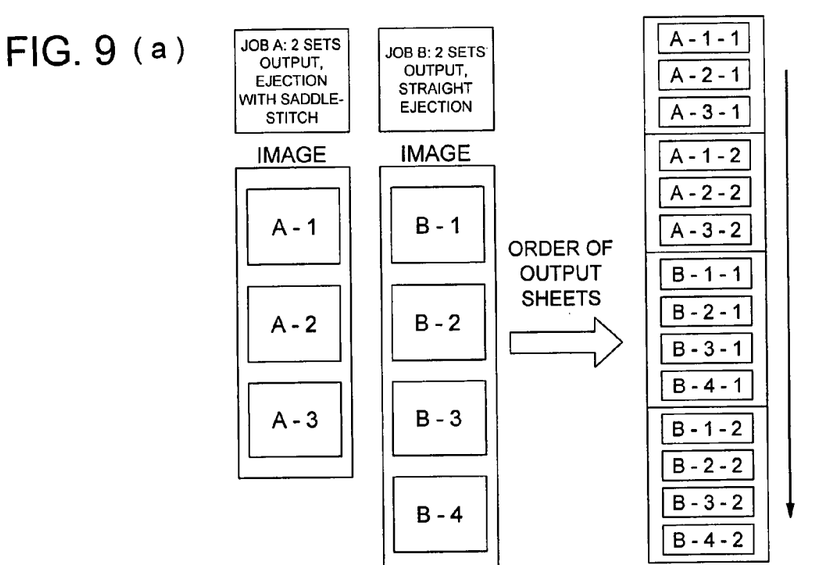

Taking Job A as the preceding job and Job B as the succeeding job, as is shown in FIG. 9(*a*), in Job A three sheets (images A-1, A-2, and A-3) are saddle stitched per copy set, in Job B four sheets (images B-1, B-2, B-3, and B-4) are output without any sheet post processing operations done on them (straight discharge). FIG. 9(*b*) shows the timing of sheet feeding (image formation) when outputting two sets each in Job A and Job B. In FIG. 9, at the time of carrying out the saddle stitching operation for Job A, since time is taken for the sheet post processing operations for each set in the post processing apparatus α, an example is shown in which a time gap between sets equivalent to three sheets is necessary (from the last sheet of one set to the first sheet of the next set). In this case, as is shown in FIG. 9(*b*), after the last sheet (A-3-1) of the first set of Job A has been fed, after leaving the necessary gap between sets (equivalent to 3 sheets), the first sheet (A-1-2) of the second set is fed (discharged to the post processing apparatus side). When the sheet feeding of Job A is completed, the sheet feeding of Job B is started. In this manner, at the time of executing a job involving sheet post processing operations, it is possible that time will be taken for sheet post processing operations in units of a set (unit of sheet post processing operations), and the output to the post processing apparatus side is being made after providing a prescribed gap in the sheet feeding interval during image formation.

Patent Document 1: Japanese Unexamined Patent Application Open to Public Inspection No. 11-188948

However, in a conventional image forming system, at the time of executing a job involving sheet post processing, the interval of sheet feeding during image formation has been made wider by a prescribed gap between sets, and during the period of this gap, the time gap is provided merely for obtaining the time necessary for carrying out sheet post processing and no processing is done on the image forming apparatus side, and hence there was the problem that the productivity gets reduced as an image forming system. In particular, when carrying out continuous outputs in large volume with jobs in the sheet post processing mode requiring such prescribed gap between sets, the cumulative time of the gap between sets during a job becomes extremely long.

Further, the technology disclosed in Patent Document 1 cannot be applied when the preceding job involves sheet post processing.

On the other hand, it is also possible to consider interrupting the preceding job and carrying out the succeeding job after interrupting the preceding job. In this case, the succeeding job is completed faster than when the execution of the succeeding job is started after the completion of the preceding job. However, in this case, after the completion of the succeeding job, it is necessary to execute the unpost processed part of the preceding job, and the sum of the time required for completing the preceding job and the time required for completing the succeeding job becomes either equivalent to or longer than when the execution of the succeeding job is started after the completion of execution of the preceding job, and hence the productivity of the image forming system does not improve.

SUMMARY OF THE INVENTION

The problem to be solved by the present invention is regarding improvement of the productivity at the time of execution successive print jobs.

One of the structures for solving the above problems is an image forming system comprising: an image forming apparatus which executes a print job to form an image on a recording medium; and a post processing apparatus which carries out a post processing to the medium on which the image has been formed; wherein, the image forming apparatus includes a control section to control the image forming apparatus such that, if there is a waiting period in a preceding print job being under execution, a succeeding print job is executed during the waiting period.

BRIEF DESCRIPTION OF THE DRAWINGS

FIG. 3(*a*) is shows an example of the contents of a job executed in the image forming apparatus and FIG. 3(*b*) shows an example of the corresponding sheet feeding timing.

FIG. 9(a) shows an example of the contents of a job executed in a conventional image forming apparatus and 9(b) shows an example of the corresponding sheet feeding timing.

DETAILED DESCRIPTION OF THE PREFERRED EMBODIMENTS

Some preferred embodiments of the present invention are described in the following.

To begin with, the configuration according to the present preferred embodiment is described below.

Figure 1:
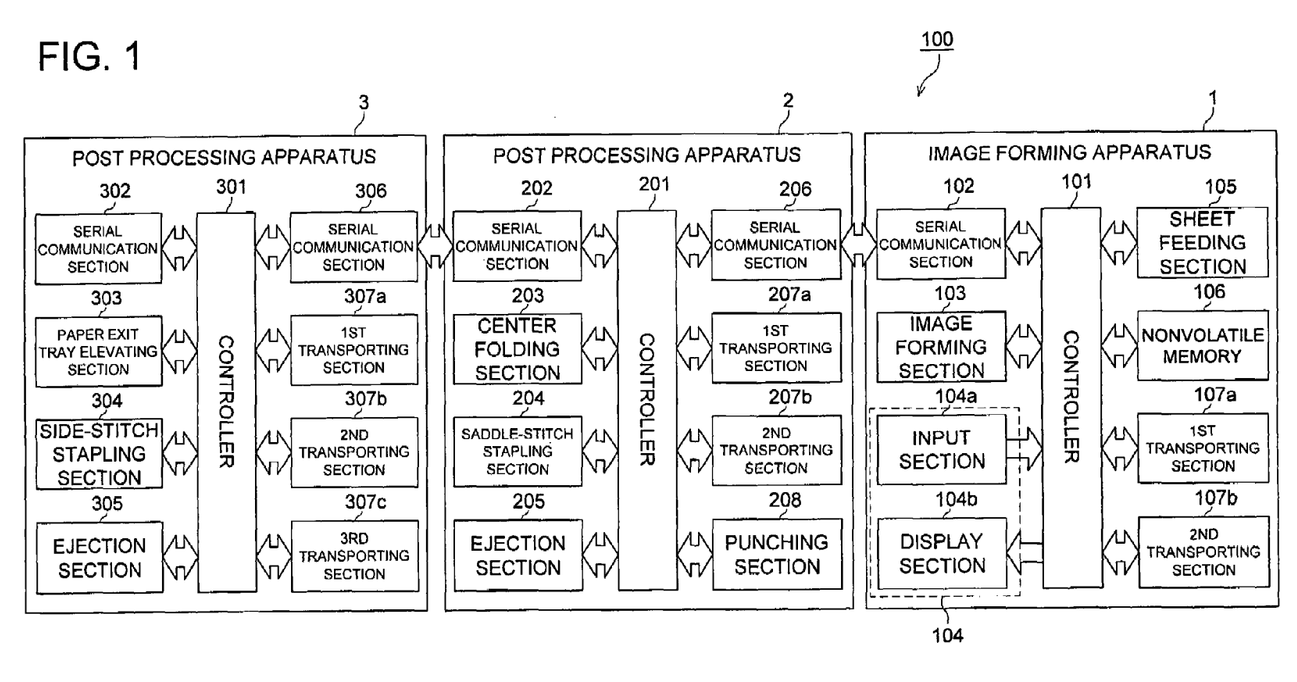
FIG. 1 is a block diagram showing the configuration of an image forming system according to a preferred embodiment of the present invention.

FIG. 1 shows the overall configuration and the configurations of important sections of the different apparatuses of an image forming system 100 according to a preferred embodiment of the present invention. As is shown in FIG. 1, the image forming system 100 is configured so that an image forming apparatus 1 and a post processing apparatus 2 are connected by serial communication, a post processing apparatus 2 and a post processing apparatus 3 are connected by serial communication, and can transmit and receive data. Further, there is no particular restriction on the number of post processing apparatuses connected to one image forming apparatus.

Next, the configuration of important sections of each apparatus configuring the image forming system 100 is described below.

To begin with, the configuration of important sections of the image forming apparatus 1 is described below.

The image forming apparatus 1 is, for example, a printer etc., and, as is shown in FIG. 1, includes a control section 101, a serial communication section 102, an image forming section 103, an operation input section 104, a sheet feeding section 105, a non-volatile memory 106, a first transporting section 107a, and a second transporting section 107b.

The control section 101 is configured to include a CPU (Central Processing Unit), a ROM (Read Only Memory), and a RAM (Random Access Memory). The CPU of the control section 101, based on an operation in the operation input section 104 or based on an instruction from an information processing apparatus such as a PC (Personal Computer) connected to the image forming apparatus 1 via communication lines such as a LAN (Local Area Network), reads out the system program or various types of processing programs stored in the ROM and loads it into the RAM, and carries out control of the different parts of the image processing apparatus 1 according to the program so loaded.

The control section 101, when there is a waiting period in the preceding print job (hereinafter called merely as a "job") that is currently being executed, carries out control for executing the succeeding job during that waiting period. Some concrete examples of the control by the control section 101 are explained in detail later on using the implementation examples 1-3.

The serial communication section 102 is constituted using a serial communication I/F (interface) etc., and controls the transmission and reception of control signals or data by serial communication between the image forming apparatus 1 and other apparatuses (such as the post processing apparatus 2).

The image forming section 103 is constituted by providing it with a photoreceptor drum, toner, etc., and, according to a print instruction from the control section 101, when a recording sheet (hereinafter called merely as "sheet") of the size and orientation instructed through the operation input section 104 or through an input from an information processing apparatus not shown in the figure is transported by the first transporting section 107a, forms an electrostatic latent image on the surface of the photoreceptor drum. Here, a sheet is an example of a recording medium, and it can also be a recording medium other than a paper sheet such as an OHP sheet, etc. Further, the image forming section 103 coats toner on the area of the surface of the photoreceptor drum that includes the electrostatic latent image, transfers and fixes the toner onto the sheet, and discharges it to the post processing apparatus 2.

The operation input section 104 is configured to have an input section 104a and a display section 104b. The input section 104a is configured by a pressure sensitive (resistive film pressure type) touch panel which is a set of grid type transparent electrodes formed on the display surface of an LCD (Liquid Crystal Display), and the coordinates of the force point which is depressed by a finger or a touch pen, etc, is detected as a voltage value, and the position signal so detected is output to the control section 101. Further, the input section 104a is provided with a variety of operation buttons such as numeric buttons, Start button, etc., and the operation signals based on button operations are output to the control section 101. The display section 104b is made of an LCD, and the display operation is made of the status display of various types of operation buttons in the display screen or of the apparatus based on the display signal input from the control section 101 and of the operation conditions of various functions.

The sheet feeding section 105 stores the sheets (or paper) on which images are to be transferred. The sheet feeding section 105, for example, has a plurality of types of sheets with different sizes stored in different sheet feeding trays provided for the different types of sheets.

The non-volatile memory 106 is configured using a flash memory, etc. and stores in a re-writable manner various types of set values necessary for the operation of the image forming apparatus 1.

The first transporting section 107a, in accordance with the instructions from the control section 101, conveys the sheets stored in the sheet feeding section 105 to the different sections of the image forming section 103. The second transporting section 107b transports the sheet along the recirculation path for carrying out double-sided printing.

Next, the configurations of important sections of the post processing apparatus 2 and of the post processing apparatus 3 are described below.

The post processing apparatus 2, as is shown in FIG. 1, is configured to have a control section 201, a serial communication section 202, a center folding section 203, a saddle-stitch stapling section 204, a sheet discharging section 205, a serial communication section 206, a first transporting section 207a, a second transporting section 207b, and a punching section 208.

The control section 201 is configured to include a CPU (Central Processing Unit), a ROM (Read Only Memory), and a RAM (Random Access Memory). The CPU of the control section 201, reads out the system program or various types of processing programs stored in the ROM and loads it into the RAM, and carries out control of the different parts of the post processing apparatus 2 according to the program so loaded.

The serial communication section 202 is constituted using a serial communication I/F (interface), etc., and controls the transmission and reception of control signals or data by serial communication between the post processing apparatus 2 and other apparatuses (such as the post processing apparatus 3).

The center folding section 203 is configured to have a sheet projecting section not shown in the figure, a folding roller, a transporting belt, and pressure rollers, etc. In the center folding section 203, upon receiving the center folding start signal from the control section 201, the sheet projecting plate of the sheet projecting section moves up in an inclined direction, the front edge of the sheet projecting plate pushes up the middle part of the stack of sheets, pushes wide open the nipping section of the folding rollers via the stack of sheets, swings and is separated. The sheet projecting plate recedes after the front edge of the sheet projecting plate passes through said nipping section, and the middle part of the stack of sheets is clasped by the folding rollers thereby forming the folding line section.

Two sets of the saddle-stitch stapling section 204 are provided in a direction at right angles to the sheet transport direction, and can be moved in a direction at right angles to the sheet transport direction by a driving section not shown in the figure. The saddle-stitch stapling sections 204, after the stack of sheets center folded by the center folding section 203 is moved to the prescribed position, staples the stack of sheets at the prescribed locations (at two locations equidistant from the center in the width direction). Further, the sheet post processing functions of the post processing apparatus 2 need not be limited to saddle stitching and stapling, but can also include, for example, the flat stitching and stapling function (to be described later).

The sheet discharging section 205 is provided with a sheet exit tray and discharges the sheets subjected to sheet post processing by the saddle-stitch stapling section etc., or the sheets with no sheet post processing done for them, and stacks the sheets on the exit tray.

The serial communication section 206 is constituted using a serial communication I/F (interface), etc., and controls the transmission and reception of control signals or data by serial communication between the post processing apparatus 2 and other apparatuses (such as the image forming apparatus 1).

The first transporting section 207a and the second transporting section 207b are transporting sections provided respectively for different functions of sheet post-processing, and transports the sheet discharged from the image forming apparatus 1 (hereinafter referred to as "output sheet") along the transport path provided separately for each sheet post-processing function using rollers that include a drive part made of a motor, etc. For example, the first transporting section 207a transports the output sheets to the center folding section 203 or the saddle-stitch stapling section 204, and the second transporting section 207b transports the output sheets to the punching section 208.

The punching section 208 punches holes of prescribed shape at the prescribed positions of the sheet discharged from the image forming apparatus 1.

The post processing apparatus 3, as is shown in FIG. 1, is configured to have a control section 301, a serial communication section 302, a exit tray elevating section 303, a flat-stitch stapling section 304 that staples the stack of sheets at a sheet edge (corner part) or at a side part of the sheet, a sheet discharging section 305, a serial communication section 306, a first transporting section 307a, a second transporting section 307b, and a third transporting section 307c. Further, the sheet post-processing functions of the post processing apparatus 3 need not be limited to flat stitching and stapling, but can also include, for example, the punching function. In addition, among the constituent elements of the post processing apparatus 3, since the parts other than the exit tray elevating section 303 and the flat-stitch stapling section 304 are almost identical to those in the post processing apparatus 2, their functional description will be omitted here.

The exit tray elevating section 303 is configured to have a sensor that detects the position of the sheet exit tray of the sheet discharging section 305, a sensor that detects the position of the top surface of the stack of sheets stacked on the sheet exit tray, and a motor that moves (raises and lowers) the sheet exit tray in the vertical direction. The exit tray elevating section 303 lowers the position of the sheet exit tray during sheet discharging in accordance with the quantity of sheets stacked on the sheet exit tray so that the sheet discharging position is placed above the top part of the output sheets stacked on the sheet exit tray. Further, the exit tray elevating section 303 raises the position of the sheet exit tray when the stack of output sheets stacked on the sheet exit tray is removed by the user.

Two sets of the flat-stitch stapling sections 304 are provided in a direction at right angles to the sheet transport direction, and can be moved in a direction at right angles to the sheet transport direction by a driving section not shown in the figure. The flat-stitch stapling sections 304, after the stack of sheets is moved to the prescribed position, staples the stack of sheets at the prescribed location.

Next, the transport path of the output sheets discharged from the image forming apparatus 1 in the post processing apparatuses is described below.

Figure 2:
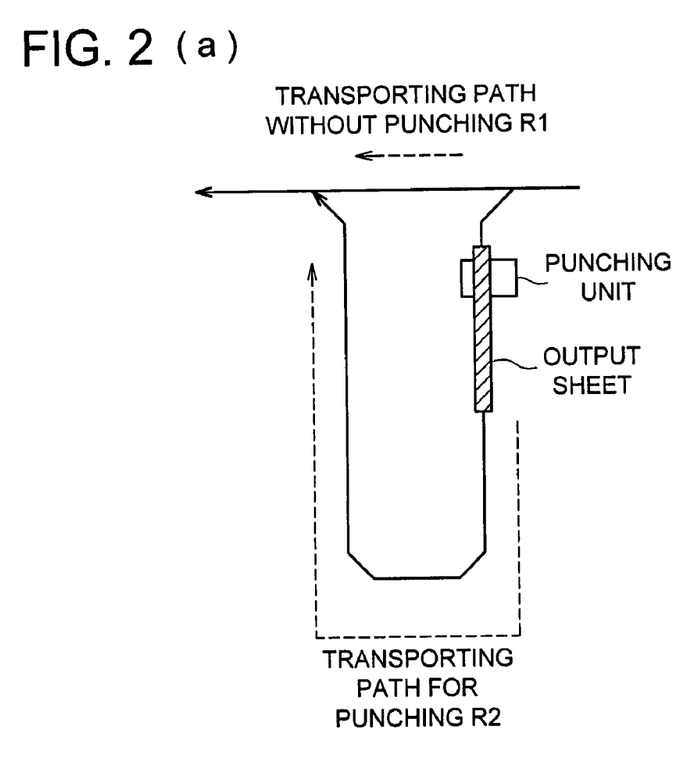
FIG. 2 is a diagram for explaining the transport path of a sheet output from the image forming apparatus to the post processing apparatus.

In FIG. 2(a) are shown the transport path R1 in the case when no punching operation is made in the post processing apparatus 2 and the transport path R2 in the case when a punching operation is made. The punching unit is provided above the transport path R2. This punching unit stops the output sheet from the image forming apparatus 1 at the prescribed position, and punches hole in at the prescribed positions in the end sections of the output sheet. FIG. 2(b) shows the transport path R3 in the case when no flat stitching and stapling operation is made in the post processing apparatus 3 and the transport path R4 in the case when a flat stitching and stapling operation is made. Above the transport path R4 is provided a stacking section that stacks the transported output sheets, and a stapling unit that staples the stack of output sheets loaded on the stacking section. In the post processing apparatuses 2 and 3, as is shown in FIG. 2, the transport path of the output sheet differs depending on the content of sheet post-processing operation and on the presence or absence of sheet post-processing.

Figure 3:
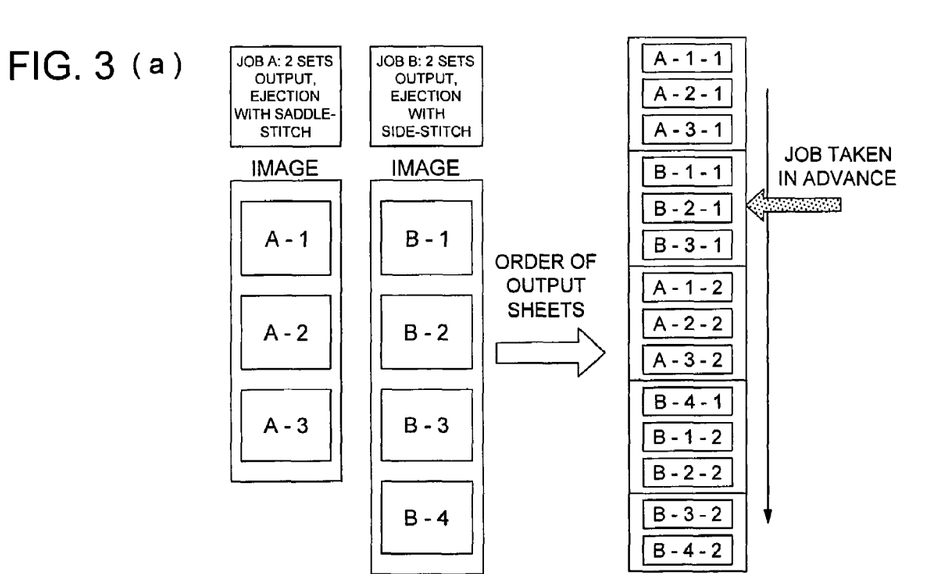

FIG. 3(a) shows the contents of the jobs (Job A and Job B) executed in the image forming apparatus 1, and FIG. 3(b) shows an example of the sheet feeding timing in these jobs. In FIG. 3, the preceding Job A is taken as the operation of outputting two sets after saddle stitching three sheets (images A-1, A-2, and A-3) per set, and the succeeding Job B is taken as the operation of outputting two sets after flat stitching four sheets (images B-1, B-2, B-3, and B-4) per set.

The image forming apparatus 1, when, for example, the Job B is reserved after the Job A, as is shown in FIG. 3, carries out advance sheet feeding (output) for Job B during the interval between sets of Job A (the waiting period of three sheets). The image forming apparatus 1, after feeding the last sheet (A-3-1) of the first set of Job A, starts sheet feeding for the reserved Job B. The interval between sets necessary for Job A is three sheets, after advance sheet feeding (output) of three sheets of Job B, the operations for the second set of Job A is continued. In the post processing apparatus 2 requiring interval between sets for Job A, the necessary interval between sets for Job A has been acquired, and there is no effect on the output. On the other hand, considering the entire image forming system 100, Job A and Job B are executed in parallel, and hence the productivity is improved at the time of executing jobs that occur successively.

Next, the operations in the present preferred embodiment are described below.

Figure 4:
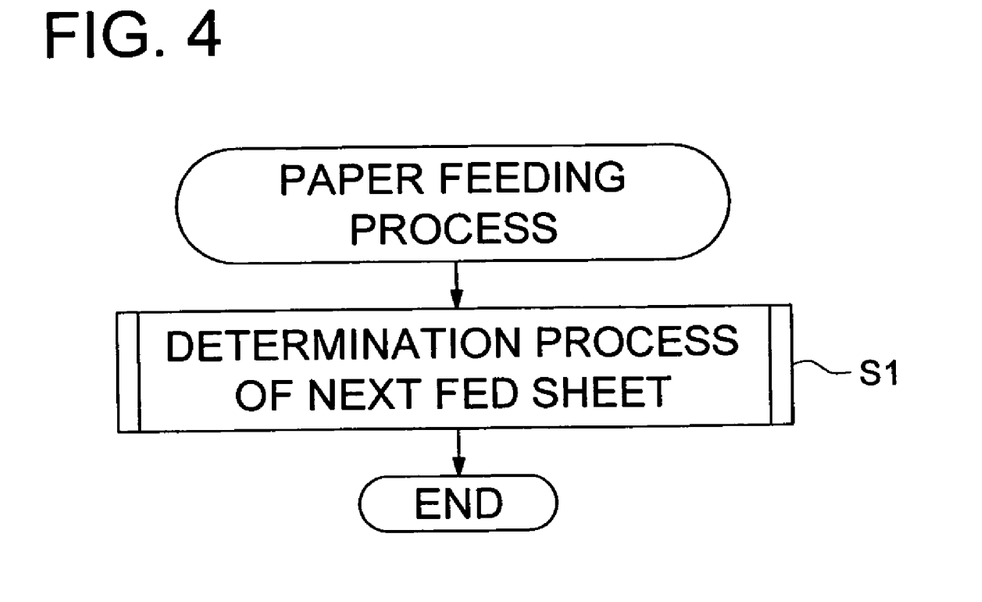
FIG. 4 is a flow chart showing the sheet feeding operation executed in an image forming system.

FIG. 4 is a flowchart of the sheet feeding operations executed by the control section 101 of the image forming apparatus 1. As is shown in FIG. 4, in the image forming apparatus 1, the next sheet feed determination process is repeated for determining the sheet to be fed next (Step S1).

Next, the next sheet feed determination process in Step S1 of FIG. 4 is explained using some concrete examples of embodiments 1-3.

EMBODIMENT 1

Figure 5:
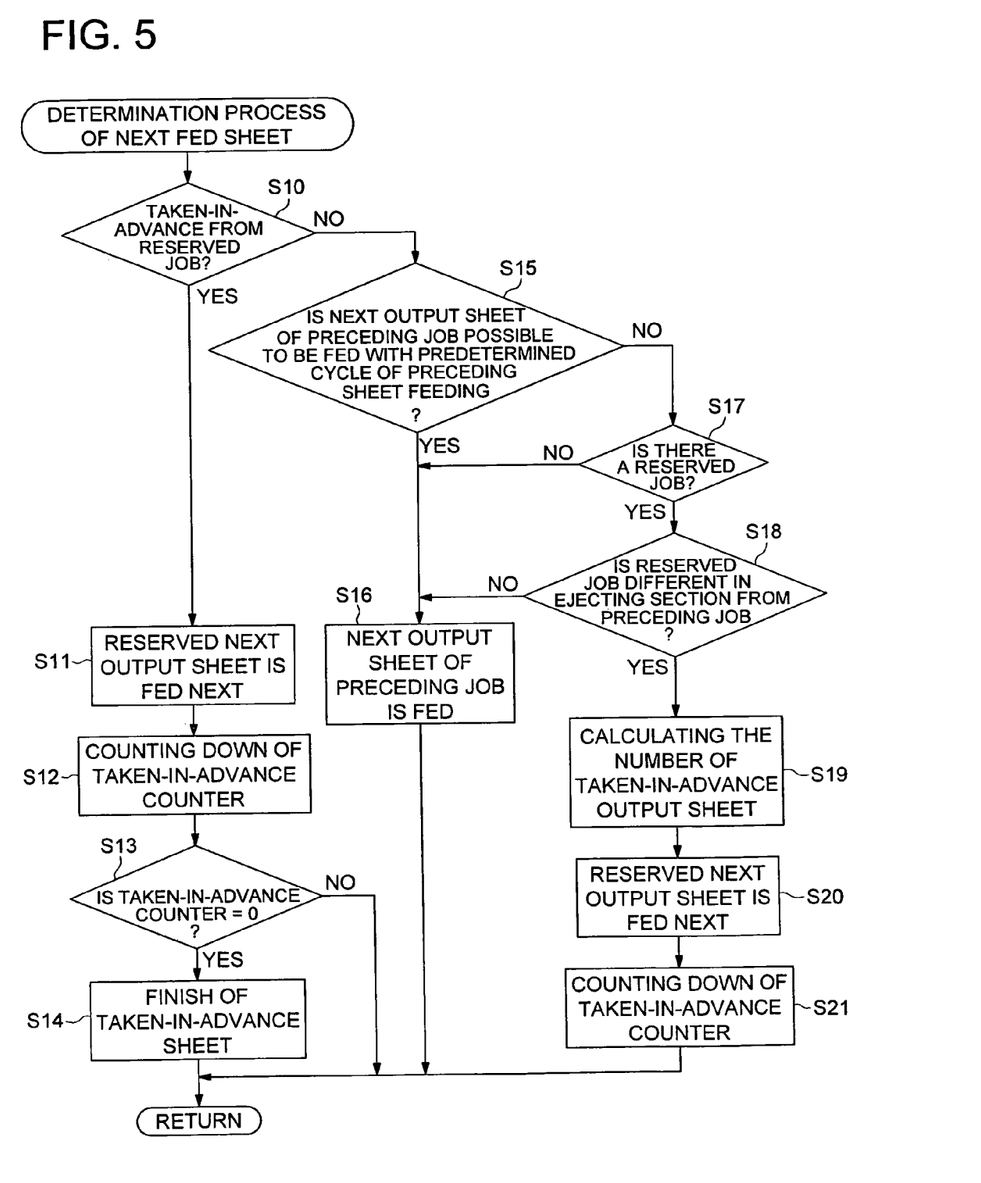
FIG. 5 is a flow chart showing the processing of determining the next sheet feed in the first preferred embodiment.

Referring to the flowchart of FIG. 5, the next sheet feed determination process of the embodiment 1 is described below.

In Embodiment 1, when the discharge destination of the reserved job (succeeding job) is different from the discharge destination of the preceding job, an explanation is given here for the case in which the execution of the reserved job is started during the waiting period of the preceding job (that is, during the period in which sheet feeding is pending). Here, the words "different discharge destinations" refer to the plurality of sheet exit trays in a single post processing apparatus or to the sheet exit trays of each of the plurality of post processing apparatuses.

To begin with, at present, a judgment is made as to whether or not a reserved job is to be executed in advance, that is, if a preceding job is in its waiting period (Step S10). In the waiting period of the preceding job, since advance sheet feeding (output) is made for the reserved job, in Step S10 a decision is made that the reserved job is being executed in advance.

In Step S10, at present, if it is judged that a reserved job is not executed in advance (NO in Step S10), for the next output sheet of the preceding job, a judgment is made as to whether or not sheet feeding is possible at the stipulated cycle rate (Step S15). A stipulated cycle is a cycle for feeding sheets within the same set. In the example of FIG. 3, after feeding the sheet A-1-1, it is judged that it is possible to feed the next sheet A-2-1 with the stipulated cycle rate. After feeding the sheet A-3-1, since the sheet A-3-1 is the last sheet in the set, it is judged that sheet feeding is not possible with the stipulated cycle rate, and interval between sets of equivalent to three sheets is required.

Further, in the present preferred embodiment, the information related to the necessary interval between sets is taken to be stored, for each type of sheet post-processing operation, in the non-volatile memory 106. Therefore, the control section 101 of the image forming apparatus 1, based on the type of sheet post-processing operations done on the output sheets A-1-1, A-2-1, and A-3-1, and by referring to the information related to the interval between sets stored in the nonvolatile memory 106, a decision is made as to whether or not an interval between sets is necessary for carrying out sheet post-processing operations on the output sheet A-1-1, A-2-1, and A-3-1, and if necessary, the necessary interval between sets is determined and posted to the sheet feeding section 10. Next, the sheet feeding section 105 determines the sheet feeding timing based on the information related to the interval between sets posted by the control section 101.

In Step S15, if it has been judged that sheet feeding is possible at the stipulated cycle rate (YES in Step S15), the next sheet in the preceding job is fed (Step S16), and the operation returns to Step S10.

In Step S15, if it has been judged that sheet feeding is not possible at the stipulated cycle rate (NO in Step S15), a judgment is made as to whether or not a succeeding reserved job is present (Step S17). In Step S17, if it was judged that there is no succeeding reserved job (NO in Step S17), the next sheet of the preceding job is fed (Step S16), and the operation returns to Step S10.

In Step S17, if it was judged that there is a succeeding reserved job (YES in Step S17), a judgment is made as to whether or not the sheet discharge destination of that reserved job is different from the sheet discharge destination of the preceding job (Step S18). In Step S18, if it is judged that the sheet discharge destinations of the preceding job and the reserved job are the same (NO in Step S18), the next sheet of the preceding job is fed (Step S16), and the operation returns to Step S10.

Further, in the present preferred embodiment, the sheet discharge destination can be specified for each job at the time that the user makes the settings for the job in a driver or in the image forming apparatus 1, and the specified sheet discharge destination is stored as data for each job in a volatile memory, not shown in the FIG., of the image forming apparatus 1. Further, the data of the specified sheet discharge destination stored in the volatile memory may be determined or changed depending on the mode of sheet post-processing included in the job. In the present preferred embodiment, the judgment as to whether or not the sheet discharge destination of the reserved job is different from the sheet discharge destination of the preceding job in Step S18 is taken to be carried out by comparing the data of the sheet discharge destination of the reserved job, from among the sheet discharge destination data stored in the volatile memory, with the data of the sheet discharge destination of the preceding job.

In Step S18, if it is judged that the sheet discharge destinations of the preceding job and the reserved job are different (YES in Step S18), the number of sheets X that that reserved job can take in advance is calculated (Step S19), and the value X is set in the advance feed counter indicating the number of sheets that have not been fed among the number of sheets that can be taken in advance.

Next, the next sheet of the reversed job is fed (Step S20). Next, the value of the advance feed counter is decremented (counted down) (Step S21), and the operation returns to Step S10. In the example shown in FIG. 3, immediately after feeding the sheet A-3-1, the number of sheets that can be fed in advance as calculated in Step S19 is 3 which corresponds to the interval between sets in the preceding job, and the feeding of the sheet B-1-1 is made in Step S20.

In Step S10, if it is judged that a reserved job is to be executed in advance (YES in Step S10), the feeding of the next sheet of the reserved job is made (Step S11). Next, the value of the advance feed counter is decremented (counted down) (Step S12), and a judgment is made as to whether or not the value of the advance feed counter is 0 after decrementing (Step S13).

In Step S13, if it was judged that the value of the advance feed counter is not 0 (NO in Step S13), the operation returns to Step S10. In Step S13, if it was judged that the value of the advance feed counter is equal to 0 (YES in Step S13), advance feeding for the reserved job is terminated (Step S14), and the operation returns to Step S10.

When the feeding of a number of sheets equal to the number of sheets that can be taken in advance by the reserved job has been completed (value of the advance feed counter=0), the feeding of the next sheet of the preceding job is started. In addition, after feeding a number of sheets equal to the number of sheets that can be taken in advance, if the preceding job has ended, the reserved job is continued, and that reserved job now becomes the preceding job.

According to the image forming apparatus 1 of the Embodiment 1, when the sheet discharge destinations of the preceding job and the succeeding job are different, by executing the succeeding job during the waiting interval of the preceding job, in the entire image forming system 100, it becomes possible to execute the preceding job and the succeeding job in parallel, and hence it is possible to improve the productivity of the image forming system 100.

Further, according to Embodiment 1, when the sheet discharge destinations of the preceding job and the succeeding job are different, by executing the succeeding job during the waiting interval of the preceding job, since there is no possibility of the discharged sheets of the preceding job and the discharged sheets of the succeeding job getting mixed at the sheet discharge destination, there is no confusion caused to the user, and it is possible to improve the productivity of the image forming system 100.

EMBODIMENT 2

In Embodiment 2, when the type of sheet post-processing operation in the reserved job (succeeding job) is different from that in the preceding job, an explanation is given here for the case in which the execution of the reserved job is started during the waiting period of the preceding job.

Figure 6:
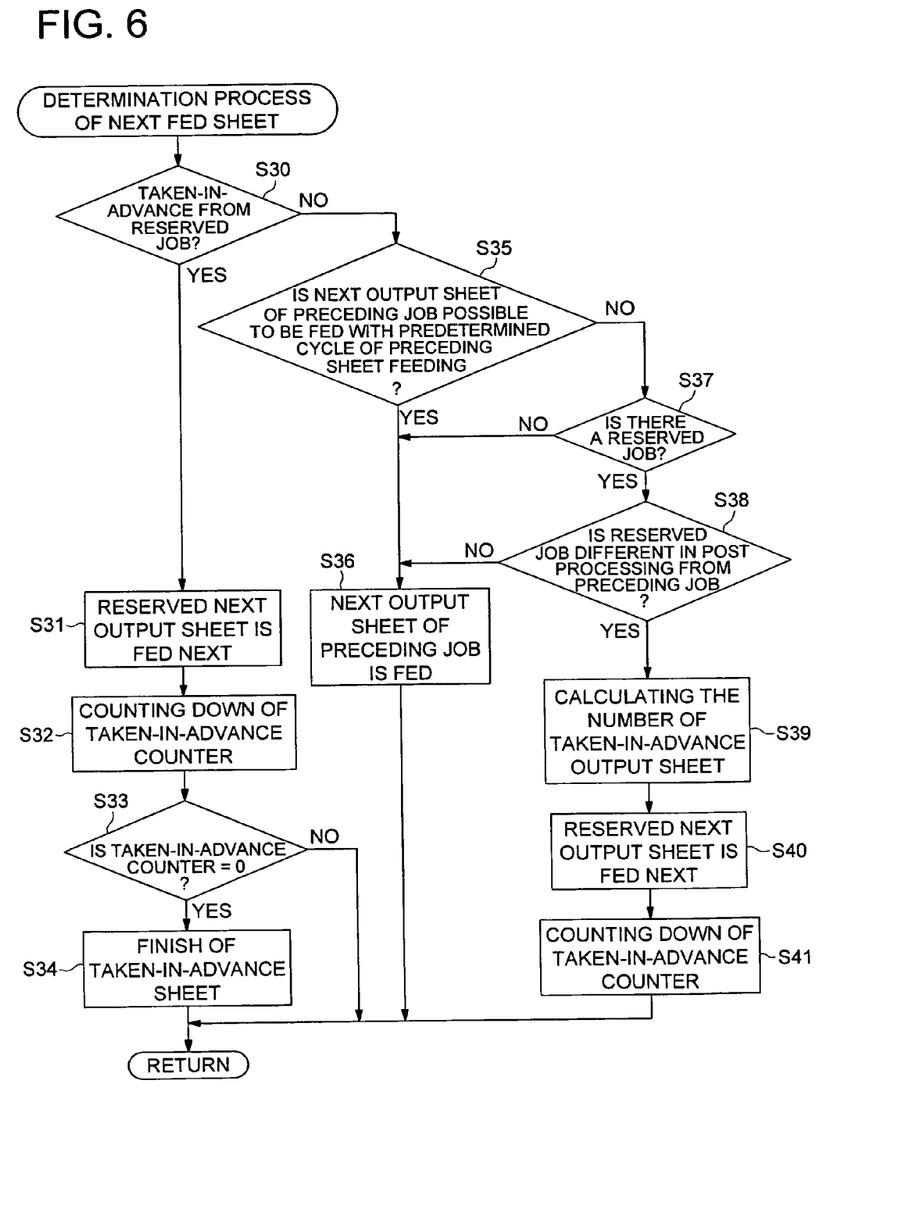
FIG. 6 is a flow chart showing the processing of determining the next sheet feed in the second preferred embodiment.

FIG. 6 is a flow chart of the next sheet feeding determination processing in Embodiment 2. In the flow chart of FIG. 6, since all the steps other than Step S38 (Steps S30-S37, S39-S41) are identical to the Steps S10-S17 and Steps S19-S21 in FIG. 5, their explanation will be omitted here. Only the step that is different from FIG. 5 is explained below.

In Step S37, if it was judged that there is a succeeding reserved job (YES in Step S37), a judgment is made as to whether or not the type of sheet post-processing operation in that succeeding reserved job is different from the type of sheet post-processing operation in the preceding job (Step S38). In Step S38, if it was judged that the type of sheet post-processing operation is the same in both the preceding job and the succeeding job (NO in Step S38), the next sheet of the preceding job is fed (Step S36), and the operation returns to Step S30.

Further, in the present preferred embodiment, the type of sheet post-processing operation of each job can be specified for each job in the image forming apparatus 1 at the time the user makes the settings for that job. Similar to the data of sheet discharge destination mentioned above, this is stored as data for each job in a volatile memory, not shown in the figure, of the image forming apparatus 1. In the present preferred embodiment, the judgment as to whether or not the type of sheet post-processing operation of that reserved job is different from the type of sheet post-processing operation of the preceding job in Step S38 is taken to be carried-out by comparing the data of the type of sheet post-processing operation of that reserved job, from among the type of sheet post-processing operation data stored in the volatile memory, with the data of the type of sheet post-processing operation of the preceding job.

In Step S38, if it is judged that the type of sheet post-processing operations of the preceding job and of the reserved job are different (YES in Step S38), the number of sheets X that that reserved job can take in advance is calculated (Step S39).

Here, the statement that the type of sheet post-processing operation in the reserved job and in the preceding job are different implies not only that the type of sheet post-processing operation set in the reserved job is different from the set of sheet post-processing operation set in the preceding job, but also includes the case when the type of sheet post-processing operation set in the preceding job has not been set in the reserved job.

According to the image forming apparatus 1 of the Embodiment 2, when the types of sheet post-processing operation of the preceding job and of the succeeding job are different, by executing the succeeding job during the waiting interval of the preceding job, in the entire image forming system 100, it becomes possible to execute the preceding-job and the succeeding job in parallel, and hence it is possible to improve the productivity of the image forming system 100.

Further, according to Embodiment 2, when the types of sheet post-processing operation of the preceding job and of the reserved job are different, by executing the reserved job during the waiting interval of the preceding job, in the sheet post-processing section during the execution of the preceding job, since it is possible to suppress the sheets related to the preceding job and the sheets related to the reserved job from clashing or from getting superimposed on each other, it is not only possible to suppress jamming, and to suppress the sheets of the preceding job and the sheets of the reserved job getting mixed, but also it is possible to improve the productivity of the image forming system 100.

EMBODIMENT 3

In Embodiment 3, when the sheet transport path in the reserved job is different from that in the preceding job, an explanation is given here for the case in which the execution of the reserved job is started during the waiting period of the preceding job.

Figure 7:
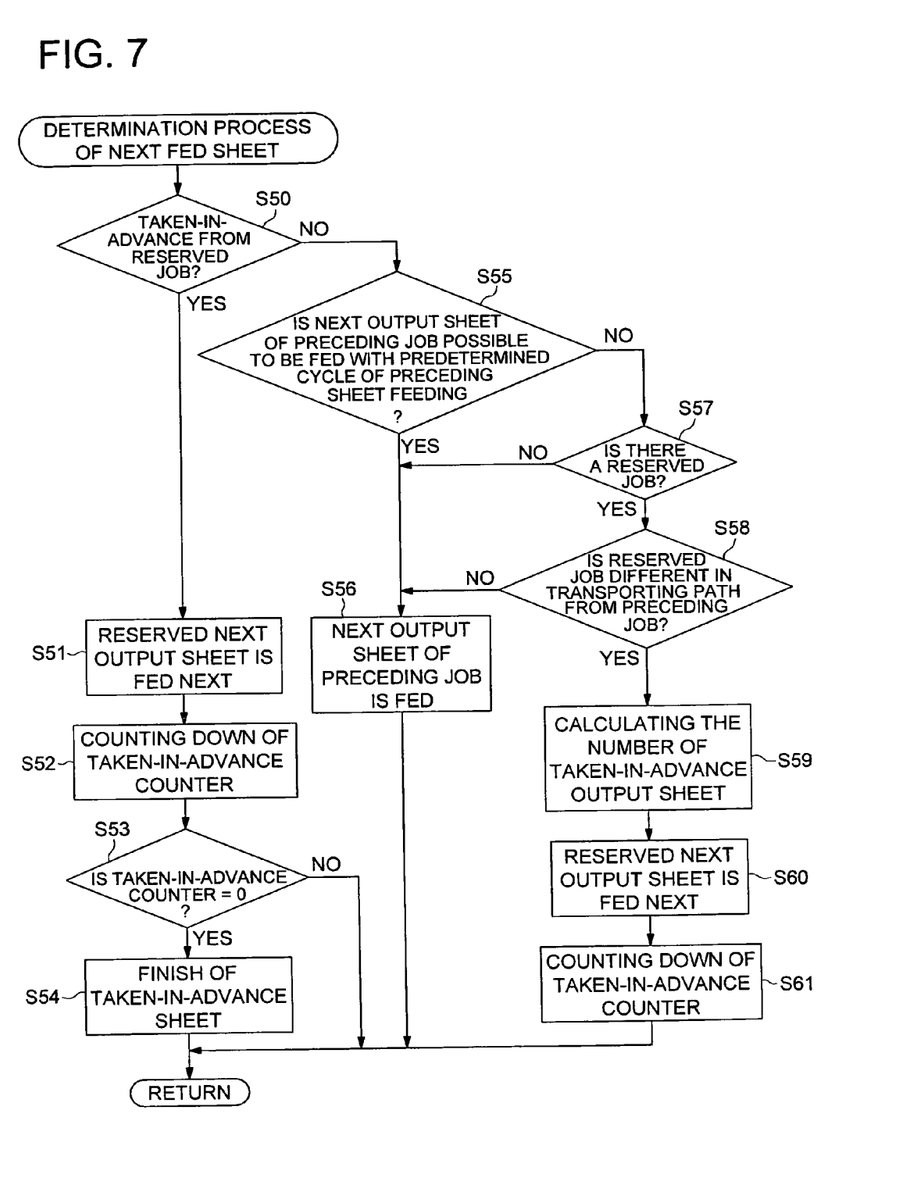
FIG. 7 is a flow chart showing the processing of determining the next sheet feed in the third preferred embodiment.

FIG. 7 is a flow chart of the next sheet feeding determination processing in Embodiment 3. In the flow chart of FIG. 7, since all the steps other than Step S58 (Steps S50-S57, S59-S61) are identical to the Steps S10-S17 and Steps S19-S21 in FIG. 5, their explanation will be omitted here. Only the step that is different from FIG. 5 is explained below.

In Step S57, if it was judged that there is a succeeding reserved job (YES in Step S57), a judgment is made as to whether or not the sheet transport path in that succeeding reserved job is different from the sheet transport path in the preceding job (Step S58). In Step S58, if it was judged that the sheet transport path is the same in both the preceding job and in the succeeding job (NO in Step S58), the next sheet of the preceding job is fed (Step S56), and the operation returns to Step S50.

Further, the sheet transport path can be determined based on at least one of the type of sheet post-processing operation, the sheet size, and the sheet discharge destination which have been specified for each job. In the present preferred embodiment, even regarding the sheet size, it is possible to specify at the time that the user makes the settings for the job in a driver or in the image forming apparatus 1, and, similar to the data of the sheet discharge destination and type of sheet post-processing operation, the specified sheet transport path is stored as data for each job in a volatile memory, not shown in the figure, of the image forming apparatus 1. In the present preferred embodiment, the judgment as to whether or not the sheet transport path of the reserved job is different from the sheet transport path of the preceding job in Step S58 is taken to be carried out by referring to at least one of the data of the type of sheet post-processing operation, the data of the sheet size, and the data of the sheet discharge destination stored for each job in the volatile memory. Further, in Step S58, when the section executing sheet post-processing that requires waiting time and that is being executed by the preceding job is not included in the sheet transport path of the succeeding reserved job, it is desirable to judge that the sheet transport path in that succeeding reserved job is different from the sheet transport path of the preceding job.

In Step S58, if it is judged that the sheet transport path of the preceding job and of the reserved job are different (YES in Step S58), the number of sheets X that that reserved job can take in advance is calculated (Step S59).

According to the image forming apparatus 1 of Embodiment 3, when the sheet transport paths of the preceding job and of the succeeding job are different, by executing the succeeding job during the waiting interval of the preceding job, in the entire image forming system 100, it becomes possible to execute the preceding job and the succeeding job in parallel, and hence it is possible to improve the productivity of the image forming system 100.

Further, according to Embodiment 3, when the sheet transport paths of the preceding job and of the succeeding job are different, by executing the succeeding job during the waiting interval of the preceding job, not only it is possible to suppress the discharged sheets of the preceding job and the discharged sheets of the succeeding job from clashing with each other, getting superimposed on each other, or getting mixed in different order in the transport path, but also it is possible to improve the productivity of the image forming system 100.

In the above manner, according to the image forming system 100 of the present preferred embodiment, when there is a waiting period in the preceding print job, by executing the succeeding print job during that waiting period, it is possible to aim at improving the productivity at the time of executing print jobs that occur successively.

What is claimed is:

1. An image forming system for executing a print job which comprises an image forming step and a post processing step, the image forming system comprising:
   an image forming apparatus which executes the image forming step to form an image on a recording medium; and
   a post processing apparatus which carries out a post processing step to the medium on which the image has been formed;
   wherein, the image forming apparatus includes a control section to control the image forming apparatus such that the image forming apparatus executes at least a part of the image forming step of a succeeding print job, in parallel with a post processing step of a preceding job being executed in the post processing apparatus in a waiting period in executing the image forming step of the preceding print job during which the image forming step of the preceding print job is suspended in the image forming apparatus, and after termination of the waiting period, the image forming apparatus executes a remaining part of the image forming step of the preceding print job.

2. The image forming system of claim 1, wherein if a destination of discharging the recording medium of the succeeding print job is different from a destination of discharging the recording medium of the preceding print job, the control section causes the image forming apparatus to execute the image forming step of the succeeding print job.

3. The image forming system of claim 1, wherein if a content of the post processing of the succeeding print job is different from a content of the post processing of the preceding print job, the control section causes the image forming apparatus to execute the image forming step of the succeeding print job.

4. The image forming system of claim 1, wherein if a transport path of the recording medium of the succeeding print job is different from a transport path of the recording medium of the preceding print job, the control section causes the image forming apparatus to execute the image forming step of the succeeding print job.

5. The image forming system of claim 4, wherein when a post processing section in the post processing apparatus executes the post processing of the preceding job, the post processing of the preceding job requiring a waiting period, and the post processing section is not included in the transport path of the succeeding print job, the control section recognizes that the transport path of the recording medium of the succeeding print job is different from the transport path of the recording medium of the preceding print job, and causes the image forming apparatus to execute the image forming step of the succeeding print job.

6. An image forming apparatus comprising:
   a control section to control the image forming apparatus such that the image forming apparatus executes a succeeding print job when there is a waiting period in executing a preceding print job which comprises an image forming step and a post processing step, during the waiting period the image forming step of the preceding print job being suspended in the image forming apparatus for a post processing step of the preceding print job in a post processing section,
   wherein when the post processing section is not included in a transport path of a recording medium of the succeeding print job, the control section recognizes that the transport path of a recording medium of the succeeding print job is different from a transport path of a recording medium of the preceding print job, and causes the image forming apparatus to execute the image forming step of the succeeding print job.

* * * * *